Figure 1:
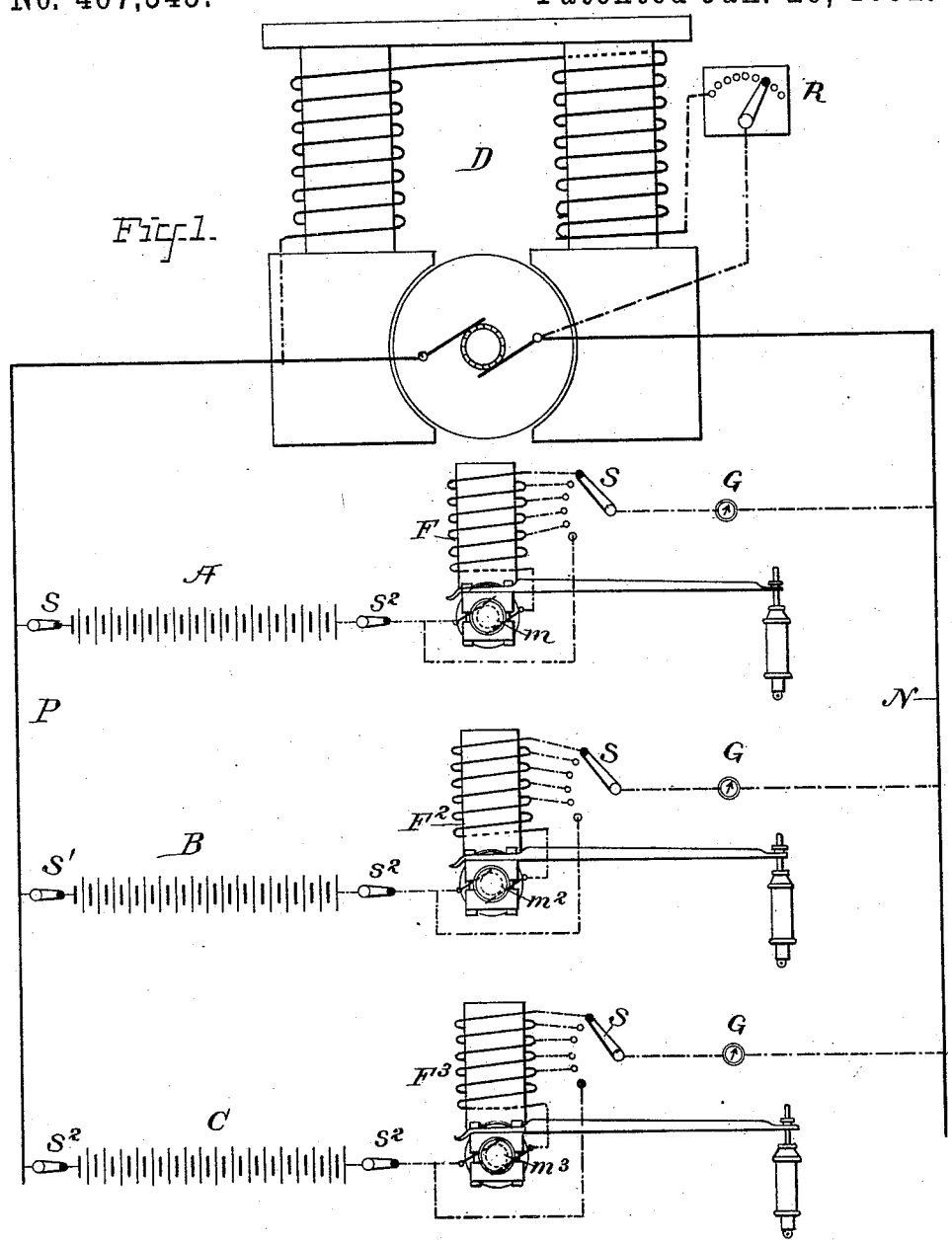

(No Model.) 2 Sheets—Sheet 1.
C. O. MAILLOUX.
CHARGING SECONDARY BATTERIES.

No. 467,545. Patented Jan. 26, 1892.

ATTEST:
J. A. Hurdle
J. F. Conrey

INVENTOR:
Cyprien O. Mailloux

By H. C. Townsend
Attorney

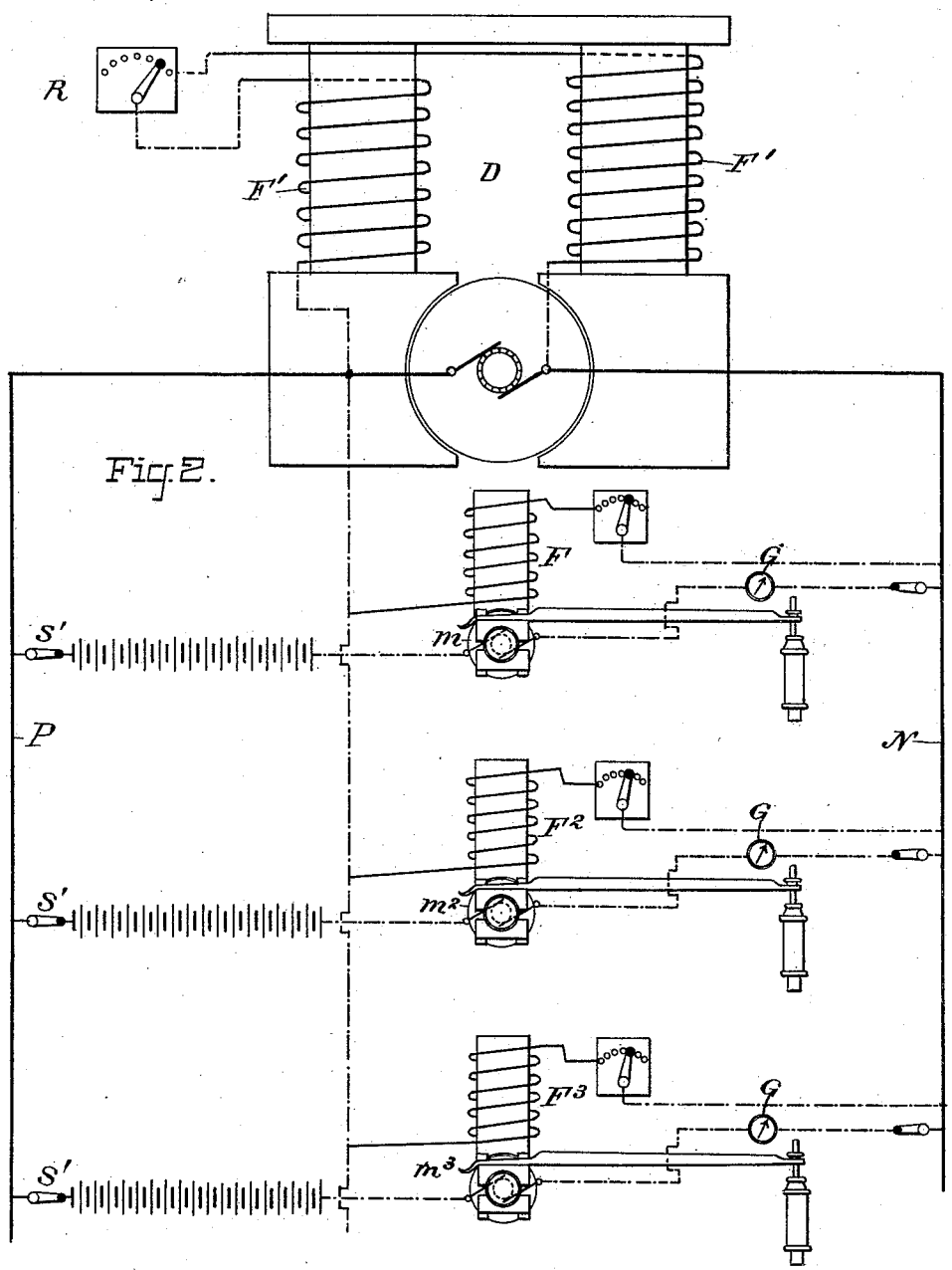

UNITED STATES PATENT OFFICE.

CYPRIEN O. MAILLOUX, OF NEW YORK, N. Y.

CHARGING SECONDARY BATTERIES.

SPECIFICATION forming part of Letters Patent No. 467,545, dated January 26, 1892.

Application filed April 24, 1891. Serial No. 390,278. (No model.)

*To all whom it may concern:*

Be it known that I, CYPRIEN O. MAILLOUX, a citizen of the United States, and a resident of New York, in the county of New York and State of New York, have invented certain new and useful Improvements in Charging Storage-Batteries, of which the following is a specification.

In the operation of charging storage-batteries it is sometimes desirable that the rate of charge should be kept constant during the whole of the charging operation or during a particular stage or phase of charge. If a source of charging-current of substantially constant potential is employed, which is ordinarily used in order that a number of batteries may be charged in multiple from the same leads or mains, it is obvious that as the charge progresses the increase of the counter electro-motive force of the battery will cut down the charging-current, and the current and rate of charge will gradually drop from the time of application until a new adjustment of the potential of the charging source or of the resistances ordinarily employed in the circuit thereof is made.

The object of my invention is to automatically preserve the rate of flow of current through the battery or its rate of charge constant for a greater or less length of time, as desired, without using cumbrous resistance-coils, which heat and require complicated connections and switches and are especially objectionable in large plants constructed with reference to the charging of a large number of batteries at or about the same time.

My invention consists, essentially, in running an electric motor having a constant load by the charging-current, the armature of such motor being placed in the circuit between the charging source and the battery, and allowing the variations of counter electro-motive force of said armature, which is of a polarity to assist the counter electro-motive force of the battery, to compensate for the variations of counter electro-motive force of the said battery during the flow of charging-current, the effect being to keep the rate of charge practically constant so long as the motor runs with a given load or given adjustment of field or other adjustment determining its specific counter electro-motive-force capacity.

In the accompanying drawings, Figure 1 is a diagram of a storage-battery-charging plant and illustrates the manner of employing my invention when a number of storage-batteries are to be charged at once from the same mains or leads. The drawing also illustrates the motor diagrammatically as provided with means whereby its counter electro-motive force may be adjusted for different batteries having different numbers of cells in series or for producing variations in the rate of charge at certain stages or steps in the charging operation, in order that, for instance, the battery may be charged at a comparatively rapid but constant rate at the beginning of the operation, and the rate may be lowered through several intermediate stages to a lower rate at the end of the operation.

Fig. 2 shows a variation in the manner of exciting the field of the motor-armature and varying such field to adjust the counter electro-motive force of the motor.

In the drawings, Fig. 1, P N indicate mains or leads having a definite charging potential maintained at substantially constant value from any desired source—as, for instance, from a dynamo D, the fields of which are excited in shunt and have a variable resistance R in circuit with them.

A B C indicate several storage-batteries charged from the mains P N and S' S², electric switches, or other means for placing said storage-batteries in circuit across the mains. $m\ m^2\ m^3$ are the armatures of electric motors placed in the branches, as indicated, so that each will be run by the current used in charging each battery. The armatures of these motors should have sufficient current-carrying capacity to carry the charging-current without undue heating or undue drop of potential. The fields of said motors may be maintained by any desired means, either by a series winding, a shunt-winding, or a separate exciter-winding, as well understood in the art. The fields of the several motors are indicated at F F² F³, and each is shown as having a sectional field-coil, the number of sections of which in circuit may be controlled by means of a switch S, working over a series of contacts.

G G are suitable current-measuring devices.

The initial electro-motive force or that upon the mains P N should be made as high or higher than the highest value that will be required to force a current through the cells to be charged when said cells have reached the phase of highest counter electro-motive force, such as toward the end of the charging process. It is well known that the counter electro-motive force of a storage-battery will gradually increase as it acquires its charge, and if no supplemental devices were employed the charging-current forced through the same from the mains P N would therefore greatly drop off.

It is the object of my invention to preserve a constant flow of current in the battery, although its counter electro-motive force may rise, and this I accomplish by simply running the motor by the charging-current (the motor having a constant load) and permitting the changes of counter electro-motive force in said motor which automatically follow the changes of counter electro-motive force in the battery to effect a compensation which shall result in a constant flow of the charging-current. The constant load of the armature may be furnished by a friction-brake—such, for instance, as indicated in the figures—or the friction of the armature-shaft in its bearings might even be utilized for the purpose.

It is well known that if a current traverses a motor-armature the turning effort of the armature in motion is independent of the speed, provided the strength of the current is maintained constant. Inversely if the static movement tending to resist the motion of the armature is maintained constant the current will thereby automatically be kept constant whatever means we may employ to vary it. Hence when the motor is in circuit with the battery, as shown, the increase of counter electro-motive force of the battery as it acquires charge, and which would tend to cut down the current, is compensated for by the action of the motor, whose speed will correspondingly vary and lessen until its counter electro-motive force decreases in amount enough to permit the same constant current flow to be maintained through it and the battery. It is seen, therefore, that so long as the magnetic field of the small machine remains constant the current rate will be automatically maintained constant. If now the magnetic field be increased in any manner, as by turning the switch, the same turning effort, as experiment proves, will now require a smaller current through the armature. The speed of the motor will instantly increase until the counter electro-motive force is sufficient to choke the current down to this reduced amount, and this current rate will be maintained constant, as before. This action may be utilized in each of the several stages of the charging. Thus, for instance, the field may be adjusted to permit the current required for the initial stage of charging to flow through the armature, and while any given adjustment of field is maintained the battery will go on charging by a definite current or at a fixed rate, which is automatically maintained by the action of the motor without any adjustment thereof. After the charging has been allowed to progress at such rate for the desired time the field may be adjusted to a greater strength, thus lessening the current which may flow, and the battery be allowed to charge at such definite constant lower rate for the desired time, and so on to the final stage of charging.

The adjustment of the current to different stages of the operation or to batteries of different resistance might be accomplished by other means—as, for instance, by varying the loading of the motor by shifting its commutator-brushes or otherwise. It is evident, for instance, that by varying the amount of pressure exerted upon the Prony brake-pulley the resistance to be overcome will be different, and that to exert the necessary pulling effort to cause motion a different rate of current must be used. Hence the current might be controlled entirely by adjusting the tension which determines the frictional resistance against the Prony brake-wheel.

In practice it is ordinarily desirable to let the battery charge at a lesser rate toward the end of the operation. To use the devices in accordance with this principle the switch S would be turned to excite the field of the motor to its smallest amount, so that the counter electro-motive force of the armature would be comparatively small and the charging-current would then be allowed to flow through the motor and the battery for a definite length of time, during which the battery would charge at a definite constant rate. The switch S may then be turned to increase the specific counter electro-motive force of the motor, so that the charging-current would be cut down and the charging then allowed to progress for a further interval during which the changes of counter electro-motive force of the motor taking place automatically in the manner before explained would keep the charging-current constant. These adjustments may be continued through any number of stages, depending upon the number of adjustments in the specific counter electro-motive forces of the motor-armature allowed by the construction of the switch or other adjusting mechanism.

As shown in Fig. 2, instead of varying the number of turns of field-coils F' in circuit by cutting them in or out of circuit, as in Fig. 1, a shunting resistance R may be used, which is connected to the terminals of the field-coil F'. By varying the amount of resistance in the shunt branch or by-path a greater or smaller amount of current is diverted from the field-coil F', and thus the field magnetism produced by a given volume of current may be readily controlled.

It will be obvious that where provision is made for charging a number of batteries at the same time motors of different sizes or power may be used in the different branches to provide for the charging of batteries differing largely in the number of cells in series.

What I claim as my invention is—

The herein-described improvement in automatically maintaining the strength of the charging-current or rate of charge in a storage-battery by running an electric motor with a constant torque by the charging-current and allowing the automatic variation of counter electro-motive force of said motor to compensate for the variations of electro-motive force of the battery as the charge progresses, as and for the purpose described.

Signed at New York, in the county of New York and State of New York, this 22d day of April, A. D. 1891.

CYPRIEN O. MAILLOUX.

Witnesses:
WM. H. CAPEL,
THOS. F. CONREY.